United States Patent
Frustaci et al.

(10) Patent No.: US 7,611,805 B2
(45) Date of Patent: Nov. 3, 2009

(54) LITHIUM/FLUORINATED CARBON (LI/CF$_x$) ELECTROCHEMICAL CELL

(75) Inventors: Dominick Frustaci, Williamsville, NY (US); Donald Kaiser, Clarence Center, NY (US); Paul Hallifax, Gasport, NY (US); John Duggan, Tonawanda, NY (US); Kenneth Moceri, North Tonawanda, NY (US)

(73) Assignee: Greatbatch Ltd., Clarence, NY (US)

( * ) Notice: Subject to any disclaimer, the term of this patent is extended or adjusted under 35 U.S.C. 154(b) by 676 days.

(21) Appl. No.: 11/214,635

(22) Filed: Aug. 30, 2005

(65) Prior Publication Data

US 2007/0117021 A1    May 24, 2007

(51) Int. Cl.
*H01M 4/75* (2006.01)
*H01M 4/72* (2006.01)
*H01M 2/16* (2006.01)

(52) U.S. Cl. .................. 429/238; 429/234; 429/246; 29/623.5

(58) Field of Classification Search ................ 429/208
See application file for complete search history.

(56) References Cited

U.S. PATENT DOCUMENTS

| | | | |
|---|---|---|---|
| 2,118,857 A * | 5/1938 | Morford ............... 439/645 |
| 3,433,679 A * | 3/1969 | Johnson et al. ......... 429/207 |
| 4,048,389 A | 9/1977 | Bubnick et al. |
| 4,154,906 A | 5/1979 | Bubnick et al. |
| 4,309,817 A | 1/1982 | Goebel et al. |
| 4,347,293 A | 8/1982 | Goebel et al. |
| 4,372,038 A | 2/1983 | Goebel |
| 5,004,656 A | 4/1991 | Sato et al. |
| 5,336,571 A | 8/1994 | Tomantschger et al. |
| 5,346,783 A | 9/1994 | Tomantschger et al. |
| 5,721,068 A | 2/1998 | West et al. |
| 5,776,632 A | 7/1998 | Honegger |
| 5,855,627 A * | 1/1999 | Huhndorff et al. ......... 29/623.2 |
| 6,010,802 A | 1/2000 | Passaniti et al. |
| 6,482,543 B1* | 11/2002 | Shelekhin et al. ........... 429/164 |
| 6,670,073 B2 | 12/2003 | Tucholski et al. |
| 6,849,353 B2 | 2/2005 | Vora et al. |
| 2001/0053473 A1 | 12/2001 | Getz |
| 2002/0155350 A1* | 10/2002 | Spillman .................. 429/181 |
| 2002/0160262 A1 | 10/2002 | Urry et al. |
| 2004/0058235 A1 | 3/2004 | Huang et al. |
| 2004/0214076 A1 | 10/2004 | Tsukamoto et al. |
| 2005/0048362 A1 | 3/2005 | Coffey et al. |

FOREIGN PATENT DOCUMENTS

FR    481.102    3/1948

* cited by examiner

*Primary Examiner*—Dah-Wei D Yuan
*Assistant Examiner*—Kwang Han
(74) *Attorney, Agent, or Firm*—Michael F. Scalise

(57) ABSTRACT

An electrochemical cell comprising a cathode of a powder material pressed into intimate contact with a rod-shaped current collector and an anode at least partially wrapped around the cathode is described. The cathode current collector is preferably provided with a plurality of offset flats offset with respect to each other. This helps prevent the cathode active material from sliding off of the rod-shaped current collector. The anode has spaced apart edges at opposite ends of its width that form a gap with the anode wrapped around the cathode. This helps in sliding the anode/cathode electrode assembly into a cylindrical tube comprising the cell casing. A preferred chemistry is a lithium/CF$_x$ activated with a nonaqueous electrolyte.

25 Claims, 17 Drawing Sheets

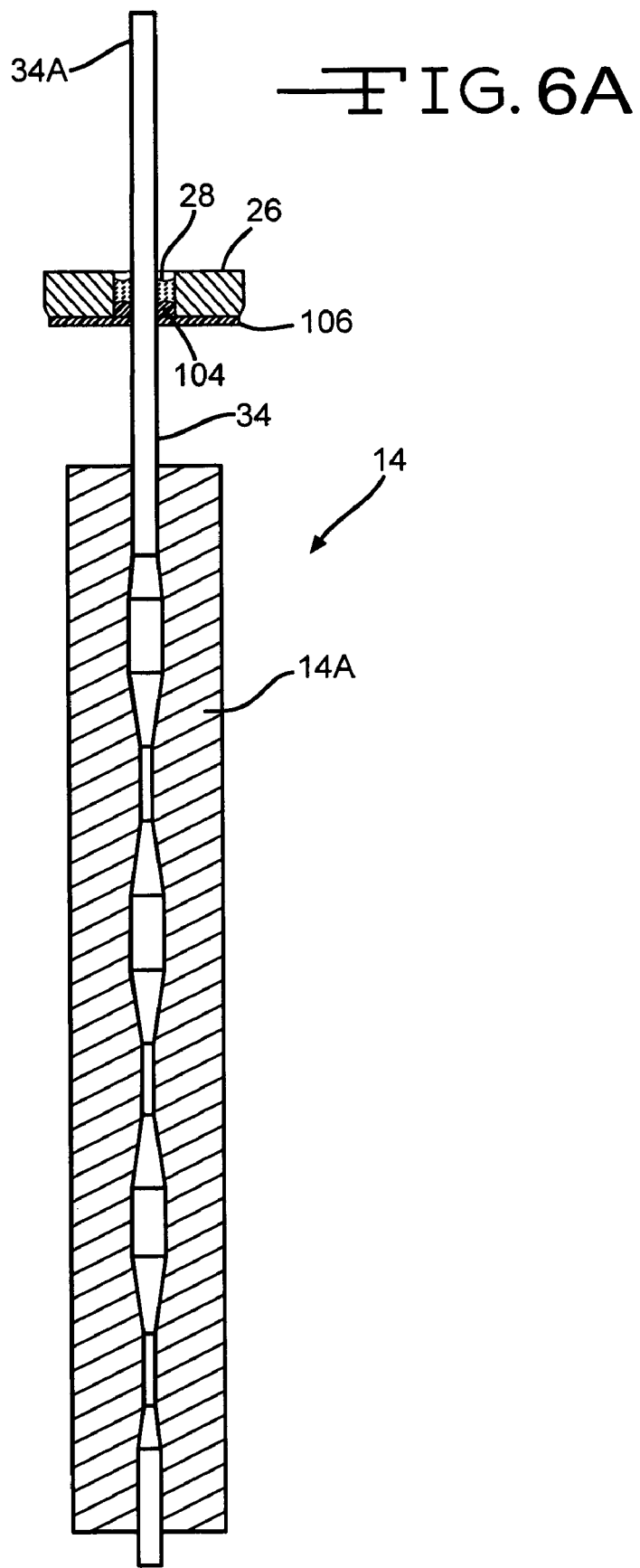

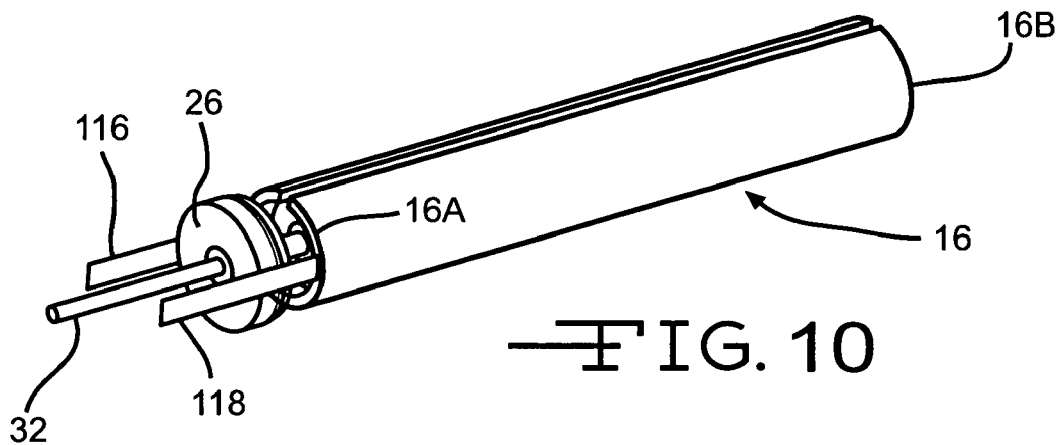
FIG. 10
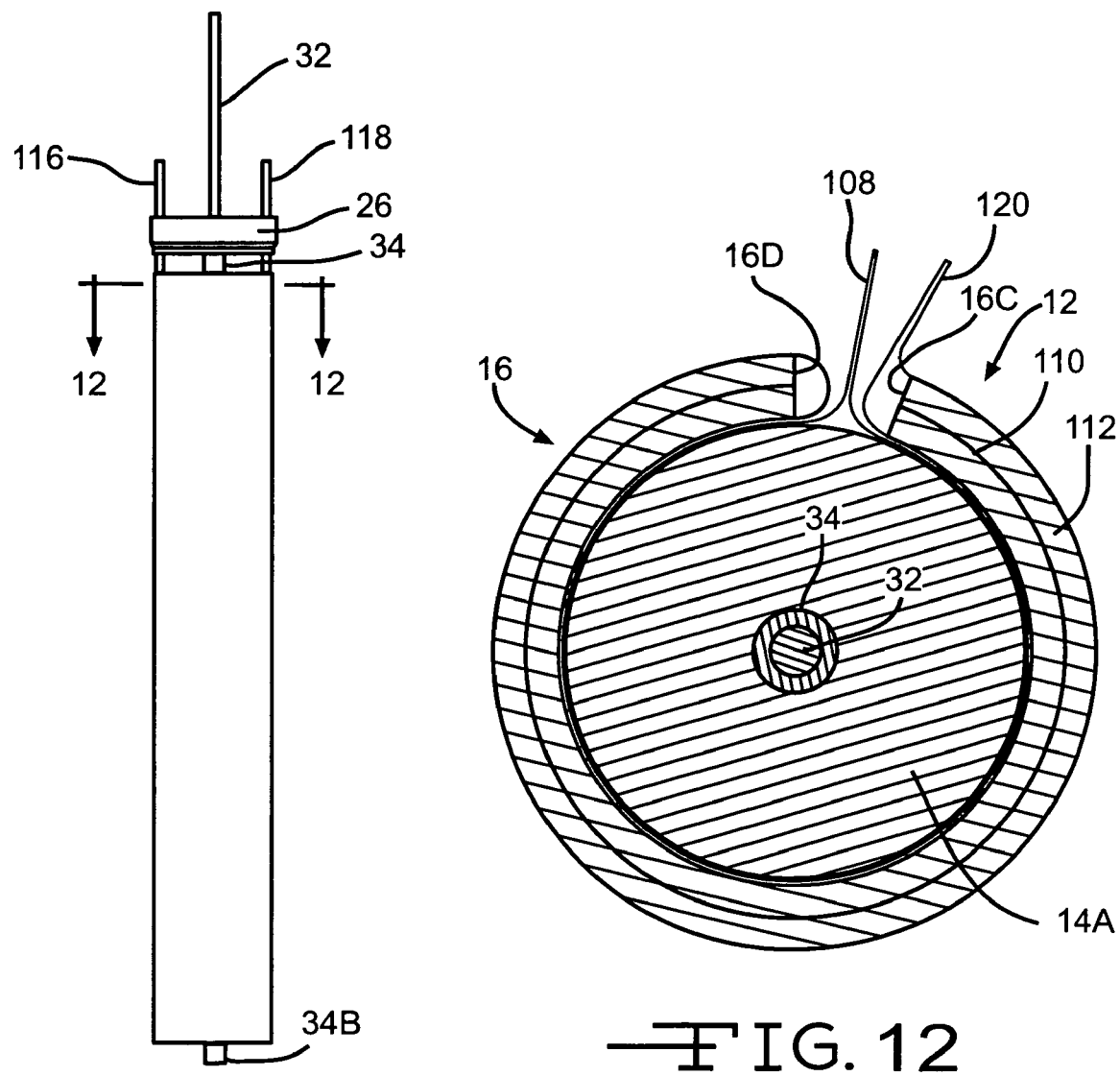
FIG. 11
FIG. 12

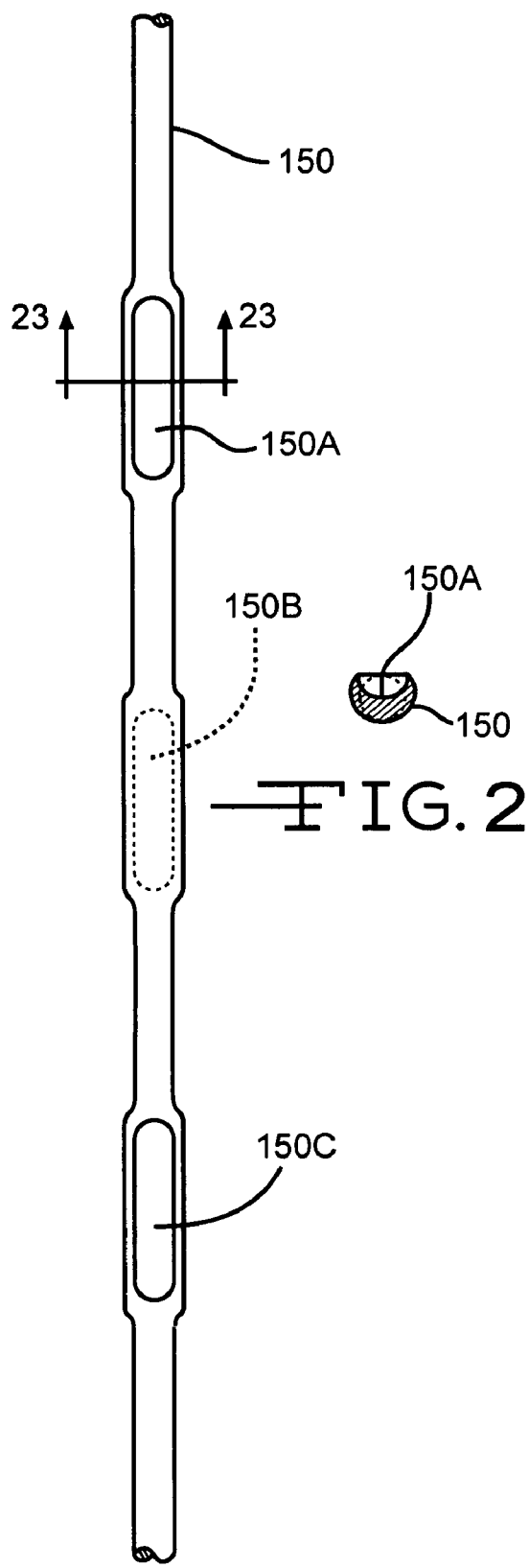
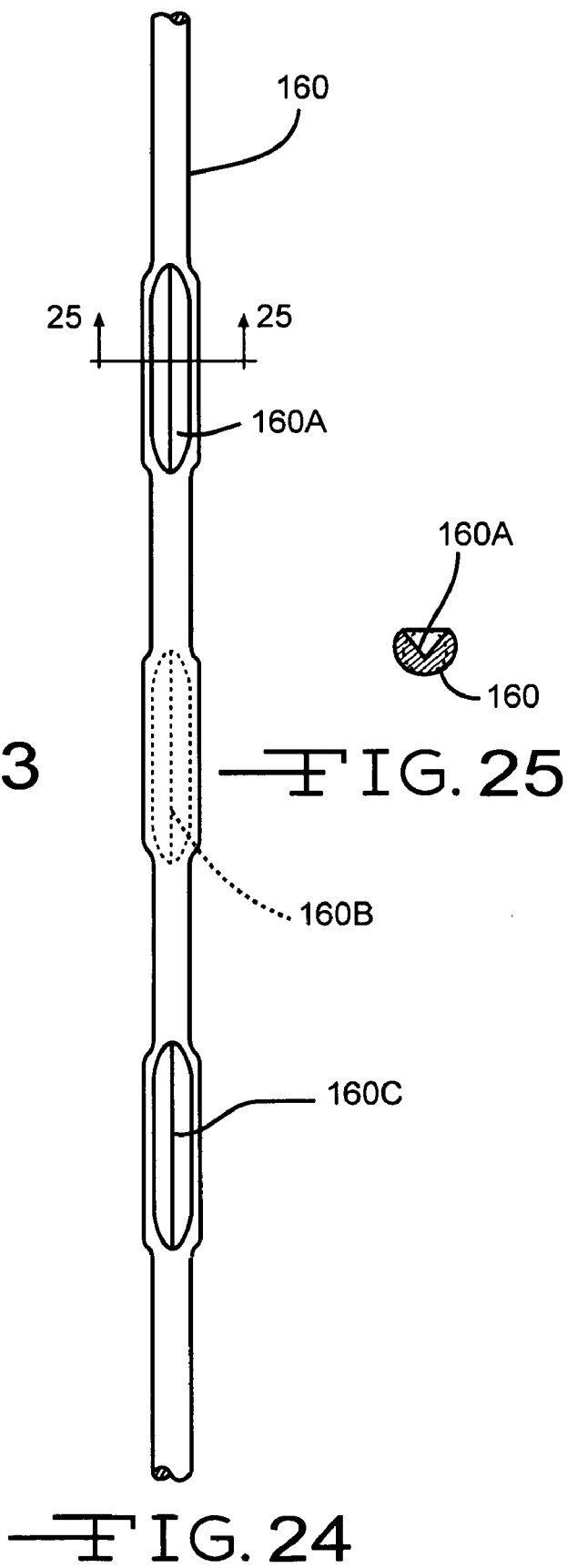

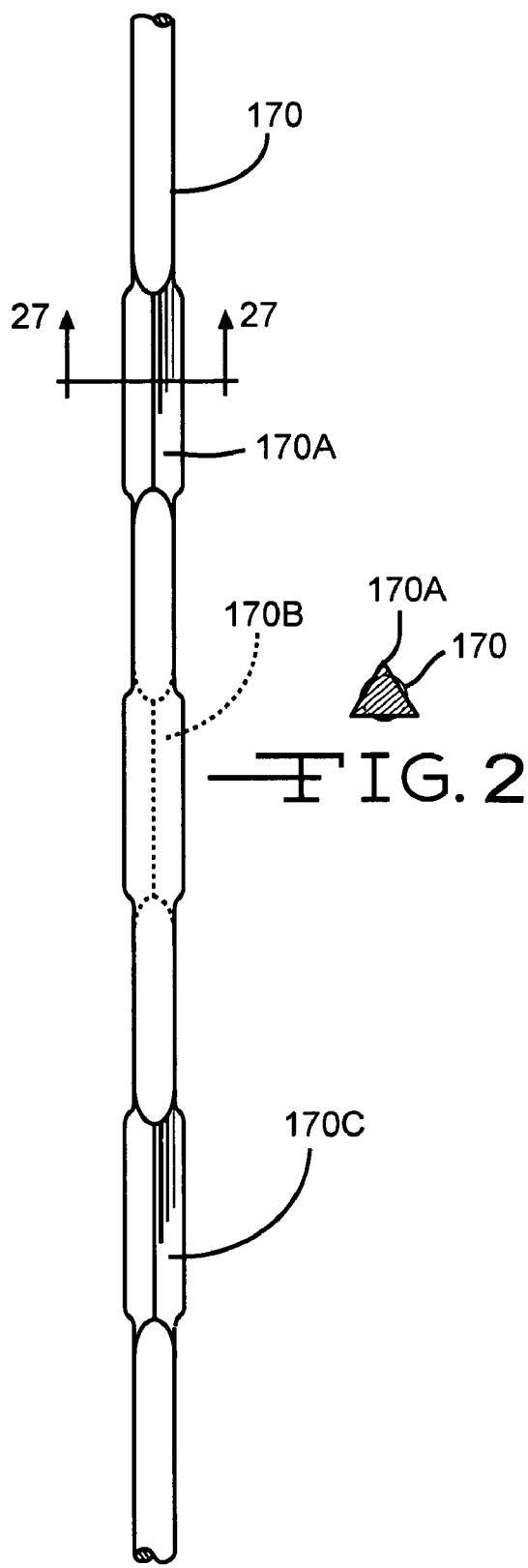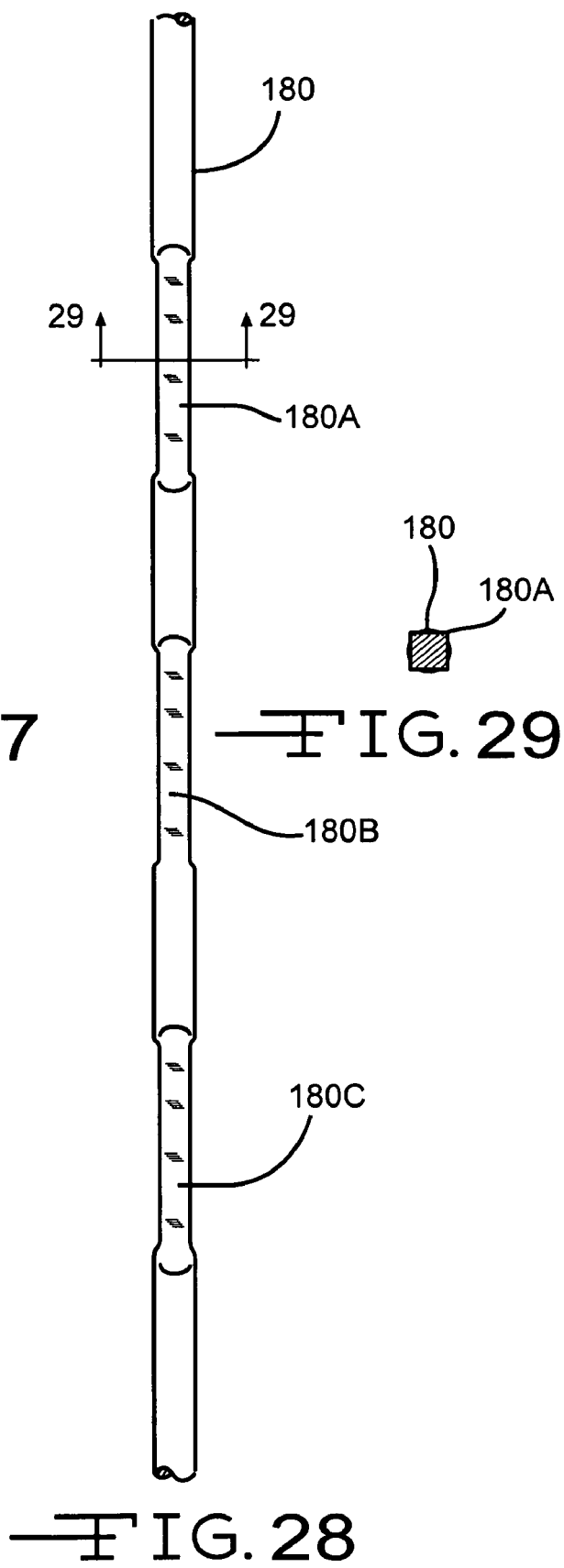

LITHIUM/FLUORINATED CARBON (LI/CF$_x$) ELECTROCHEMICAL CELL

BACKGROUND OF THE INVENTION

The present invention generally relates to the conversion of chemical energy to electrical energy. More particularly, the invention describes an electrochemical cell having an anode or negative electrode and a cathode or positive electrode provided in a bobbin-shaped configuration. This electrode assembly is then housed in a cylindrically shaped casing. Preferred cell chemistry is of a lithium anode and a fluorinated carbon (CF$_x$) cathode.

SUMMARY OF THE INVENTION

The present invention relates to an electrochemical cell comprising an anode active material, such as lithium or LiC$_6$, contacted or covering an anode current collector and a solid cathode active material, such as fluorinated carbon, silver vanadium oxide, or lithium cobalt oxide, contacted to a rod-shaped cathode current collector.

The preferred CF$_x$ material is formed into a cylindrically shaped body pressed into intimate contact with the rod-shaped cathode current collector. In order to augment this contact and to prevent potential movement of the CF$_x$ axially along the current collector, the rod is provided with a plurality of flat areas. These are made by subjecting the rod to a forging operation to flatten it at spaced locations along its length. Preferably, the flats are angularly offset with respect to each other. This means that the face or generally planar area of one flat is at an angle with respect to another adjacent flat. Then, the anode is wrapped around the cylindrically shaped cathode and the electrode assembly is housed inside a casing, preferably of a cylindrical construction.

A terminal pin is joined to the cathode current collector rod. The terminal pin is preferably of molybdenum, while the cathode current collector is preferably of titanium. Since these materials are difficult to weld together, especially with the terminal pin being of a relatively small diameter, a portion of the terminal pin is received in a bore provided in the end of the rod shaped cathode current collector, which is preferably of titanium. The other end of the terminal pin is supported in a lid of the casing by an insulating glass. The electrode assembly is activated with a nonaqueous electrolyte hermetically sealed inside the casing. This makes the present cell particularly useful for powering implantable medical devices, such as cardiac pacemakers, defibrillators, drug pumps, neurostimulators, and the like.

These and other aspects of the present invention will become more apparent to those skilled in the art by reference to the following description and to the appended drawings.

BRIEF DESCRIPTION OF THE DRAWINGS

FIG. 6A is a side elevational view of an alternate embodiment of FIG. 6, but with the proximal end 34A of the couple 34 supported in an insulated manner in the header assembly 22.

FIG. 10 is an isometric view of the electrode assembly being formed in FIG. 9.

FIG. 11 is a side elevational view of the electrode assembly shown in FIG. 10.

FIG. 12 is a cross-sectional view along line 12-12 of FIG. 11.

FIG. 22 is an elevational view of an alternate embodiment of a couple 150 provided with scalloped portions 150A, 150B and 150C.

FIG. 23 is a cross-sectional view along line 22-22 of FIG. 22.

FIG. 24 is an elevational view of an alternate embodiment of a couple 160 provided with V-shaped indentation portions 160A, 160B and 160C.

FIG. 25 is a cross-sectional view along line 25-25 of FIG. 24.

FIG. 26 is an elevational view of an alternate embodiment of a couple 170 provided with triangular flats 170A, 170B and 170C.

FIG. 27 is a cross-sectional view along line 27-27 of FIG. 26.

FIG. 28 is an elevational view of an alternate embodiment of a couple 180 provided with square shaped flats 180A, 180B and 180C.

FIG. 29 is a cross-sectional view along line 29-29 of FIG. 28.

DETAILED DESCRIPTION OF THE PREFERRED EMBODIMENTS

Figure 1:
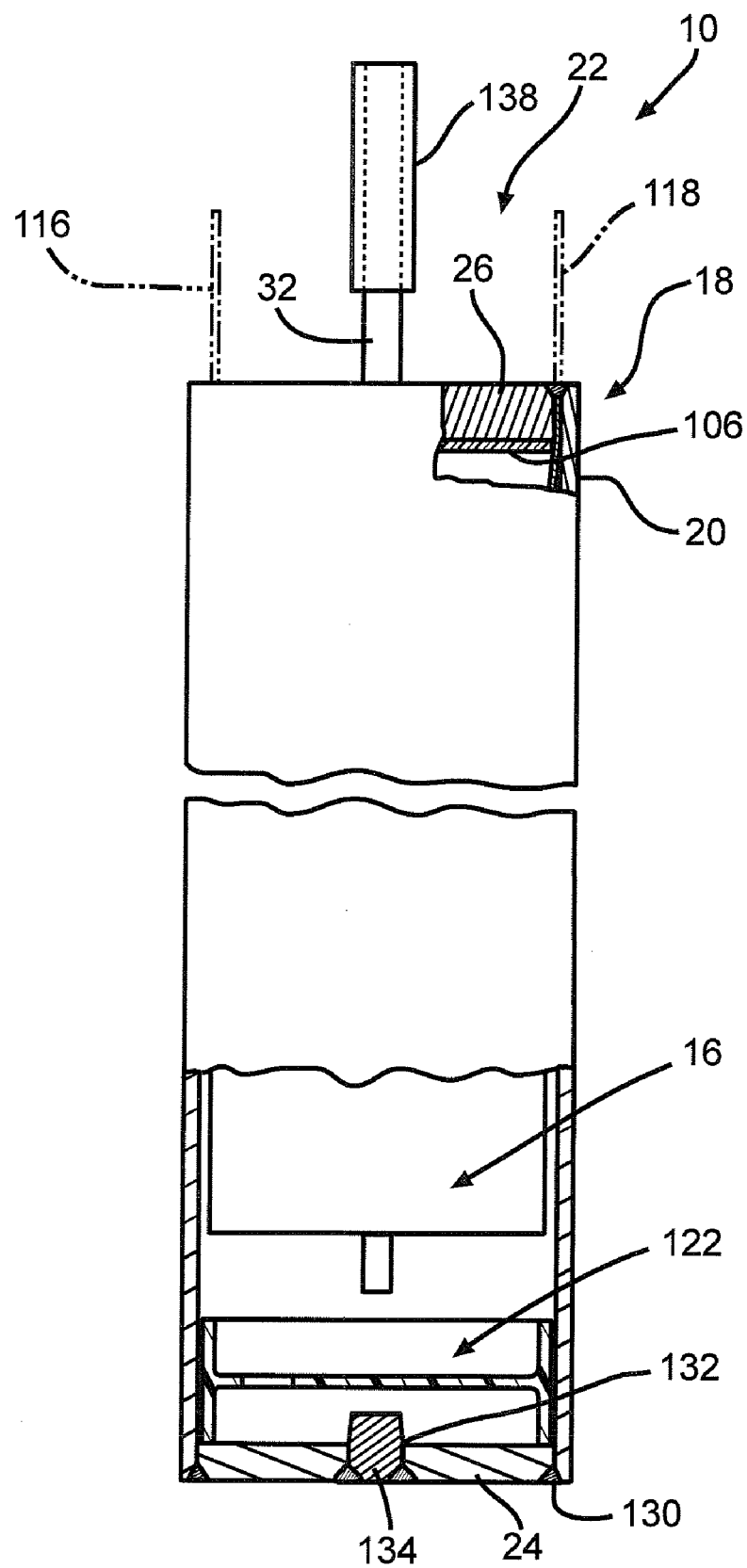
FIG. 1 is an elevational view, partly in cross-section, of an electrochemical cell 10 of the present invention.

Referring now to the drawings, FIG. 1 is a partial cross-sectional view of an electrochemical cell 10 according to the present invention. The cell comprises an electrode assembly 12 (FIG. 12) including a cathode 14 (FIG. 6) and an anode 16 (FIG. 8) provided in a bobbin-shaped configuration. The bobbin-shaped electrode assembly 12 is housed inside a cylindrically shaped casing 18 made of metal, such as stainless steel, titanium, nickel, aluminum, or other suitable electrically conductive material. The casing comprises a cylindrical tube 20 that is closed at its upper end by a header assembly 22 (FIG. 5) and at its lower end by a lower lid 24 (FIG. 1).

Figure 6:
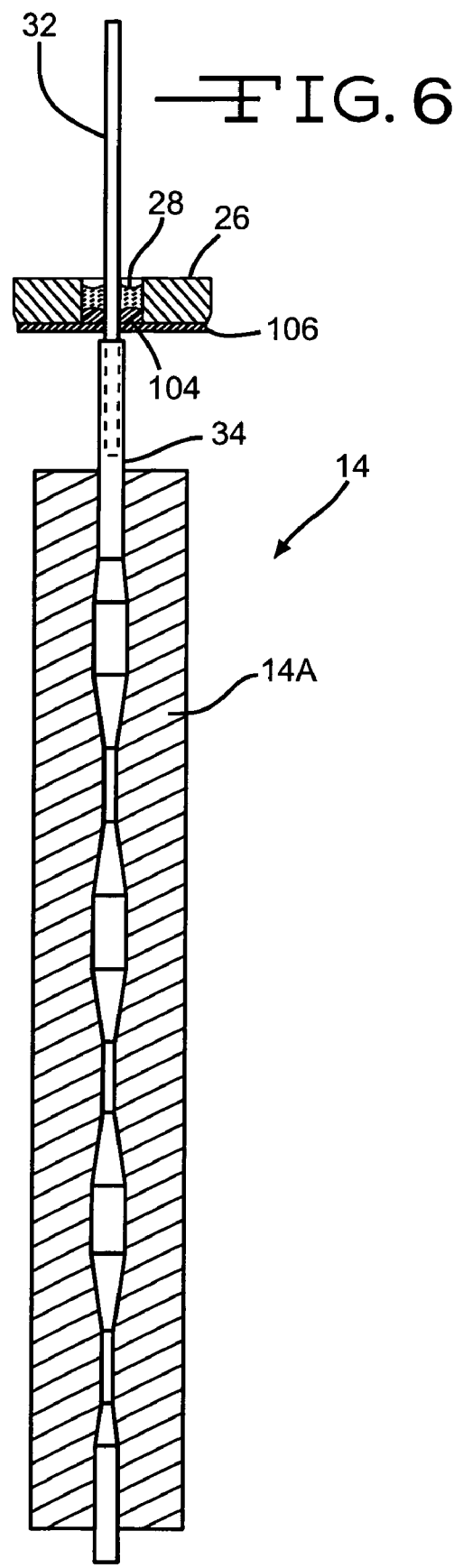
FIG. 6 is a side elevational view of a terminal pin 32 supported in an insulated manner in the header assembly 22 of FIG. 5 and connected to the proximal end 34A of the couple 34.

Preferably, the cell 10 is built in a case negative design with the casing 18 serving as the anode terminal. However, the cell can also be built in a case-positive design. In that respect, the electrode shown in FIG. 6 is the anode and the other electrode (FIG. 8) is the cathode. Both the case-negative and case-positive electrode designs are well known by those skilled in the art.

Figure 5:
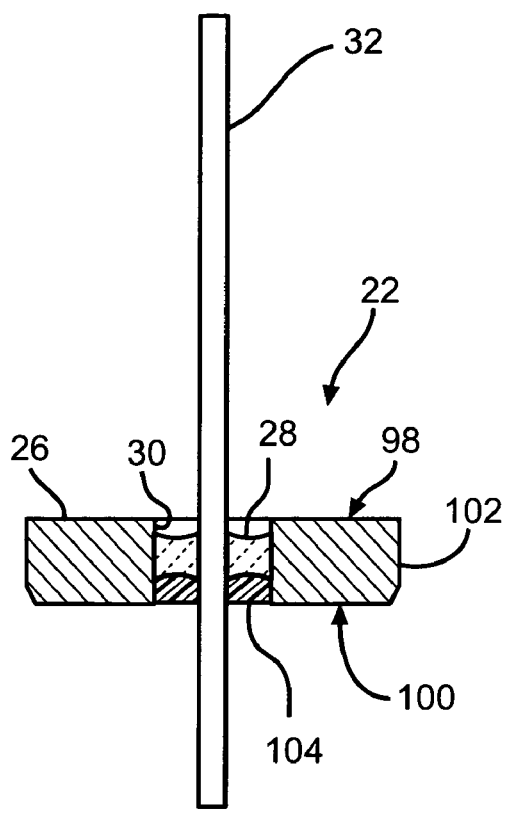
FIG. 5 is a side elevational view of the header assembly 22.

In the enlarged view of FIG. 5, the header assembly 22 comprises an upper lid 26 supporting a glass material 28 sealing between a lid opening 30 and a terminal pin 32. The terminal pin 32 is of molybdenum, aluminum, nickel alloy, or stainless steel, the former being preferred. The sealing glass 28 is of a corrosion resistant type having up to about 50% by weight silicon such as CABAL 12, TA 23 or FUSITE 425 or FUSITE 435. This structure is commonly referred to as a glass-to-metal seal (GTMS).

In the preferred case-negative cell design, the cathode 14 includes a cathode active material 14A supported in a surrounding and contact relationship with a couple 34 serving as a current collector. The current collector couple 34 is of titanium, tantalum, platinum, gold, aluminum, cobalt nickel alloys, highly alloyed ferritic stainless steel containing molybdenum and chromium, and nickel-, chromium- and molybdenum-containing alloys, the former being preferred. The cathode active material is preferably carbon or fluorinated carbon. Other suitable cathode active materials include silver vanadium oxide, copper silver vanadium oxide, copper vanadium oxide, manganese dioxide, titanium disulfide, copper oxide, copper sulfide, iron sulfide, iron disulfide, lithium cobalt oxide, and mixtures thereof.

Figures 2, 2A:
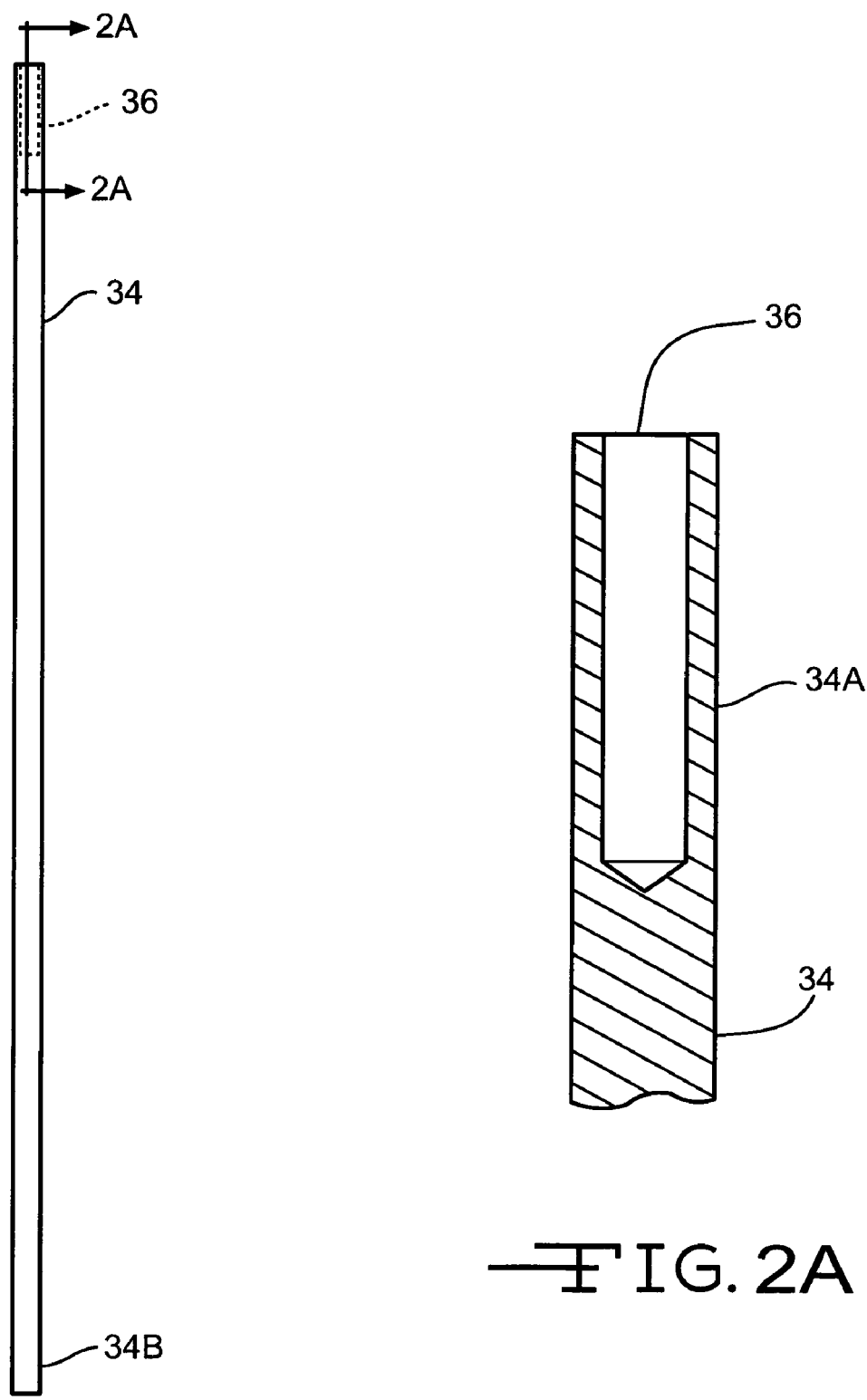
FIG. 2 is an elevational view of a cathode couple 34 before it is provided with the flats shown in FIGS. 3 and 3A.
FIG. 2A is an enlarged view of the proximal end 34A of the couple 34 shown in FIG. 2.
Figures 3, 3A, 4:
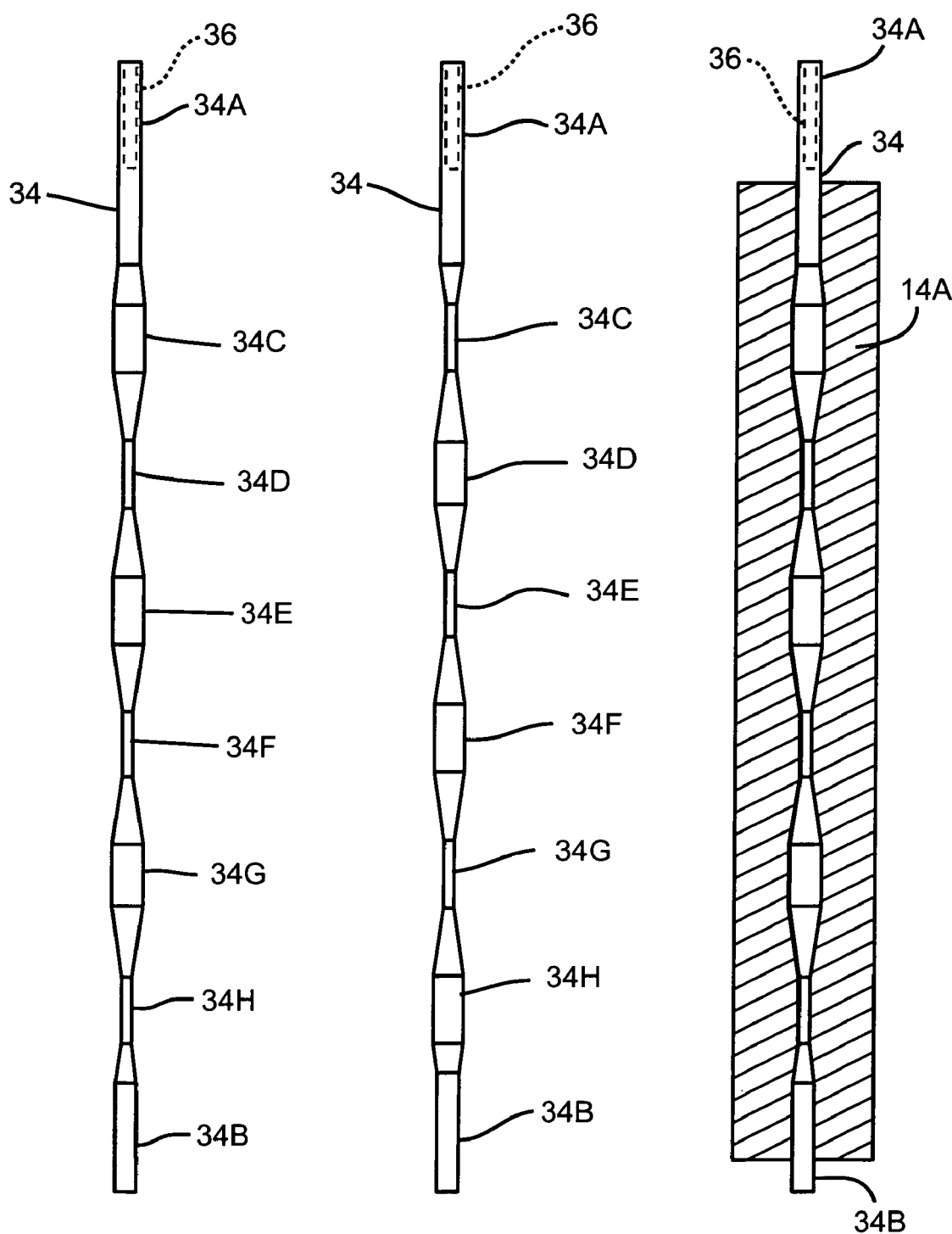
FIGS. 3 and 3A are elevational views of the couple shown in FIG. 2, but after having been provided with flats 34C to 34H.
FIG. 4 is a cross-sectional view of cathode active material 14A contacted to the couple of FIGS. 3 and 3A.

As shown in FIGS. 2 and 2A, the couple 34 begins as a cylindrical rod having a length between a proximal end 34A and a distal end 34B. A longitudinally aligned, co-axial counter bore 36 is provided in the proximal couple end 34A such as by drilling, and the like. The bore 36 has a diameter and depth sufficient to receive the proximal end of the terminal pin 32. However, before this connection is made the couple is subjected to a forging or machining operation that provides it with a plurality of flattened areas along its length. As shown in FIGS. 3 and 3A, the couple has six flats 34C, 34D, 34E, 34F, 34G and 34H, each disposed in a plane 90° offset from the flat immediately above or below it. Frustoconical transition portions are intermediate successive flats as well as between the proximal end 34A and flat 34C and between the distal end 34B and flat 34H. The flats 34C to 34H help maintain intimate contact between the cathode active material and the current collector couple 34.

Although six offset flats are shown, that should not be seen as limiting. At least one flat, and preferably two or more offset with respect to each other are required to provide a sufficient contact surface area so that the cathode active material does not slide axially along the couple 34. Also, the flats need not be 90° offset; they can be offset in a range from 5° to 90° with respect to each other.

Figure 16:
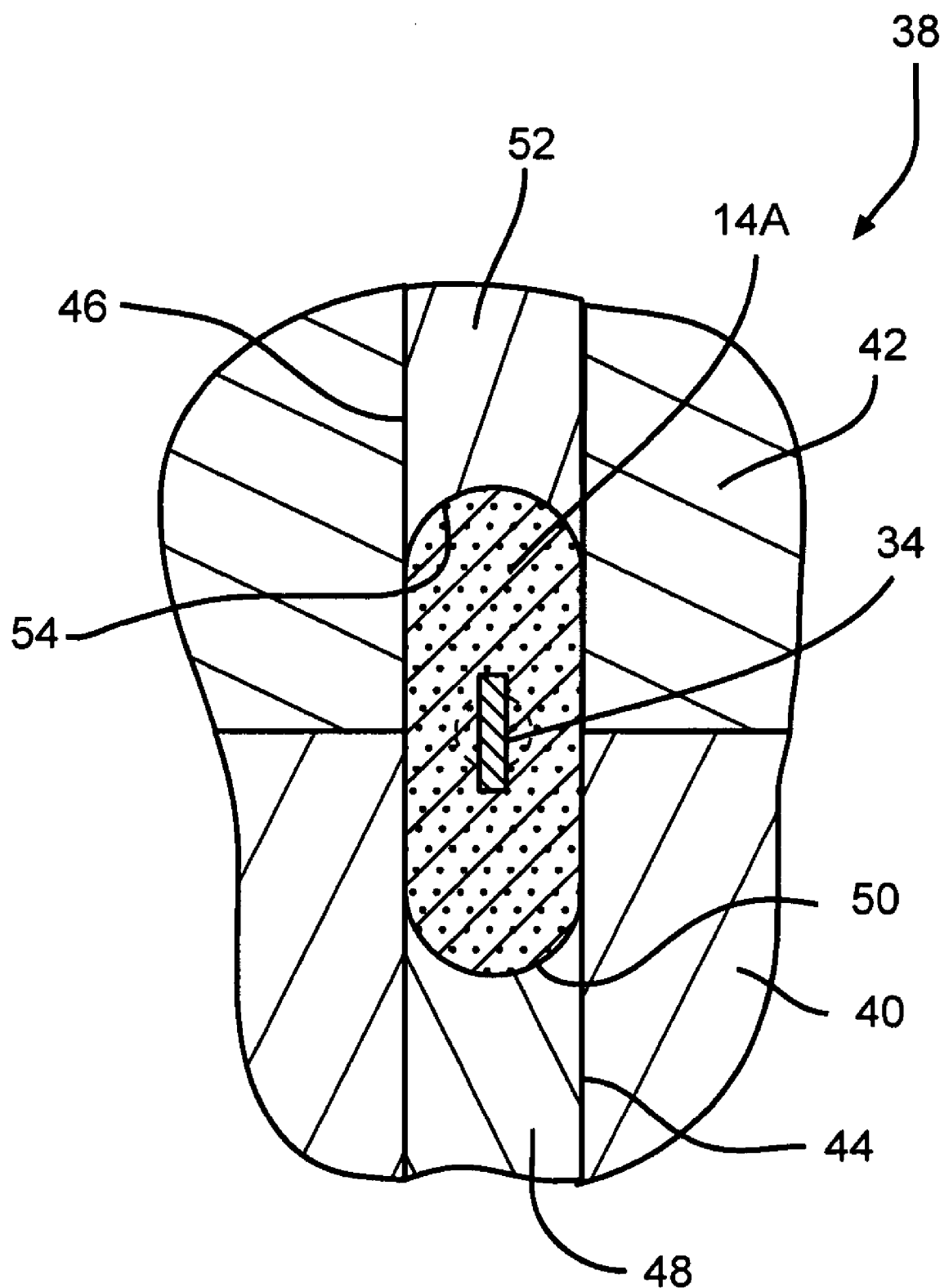
FIG. 16 is a partial cross-sectional view of a fixture 38 for forming the cathode 14 in a radial pressing process.
Figure 17:
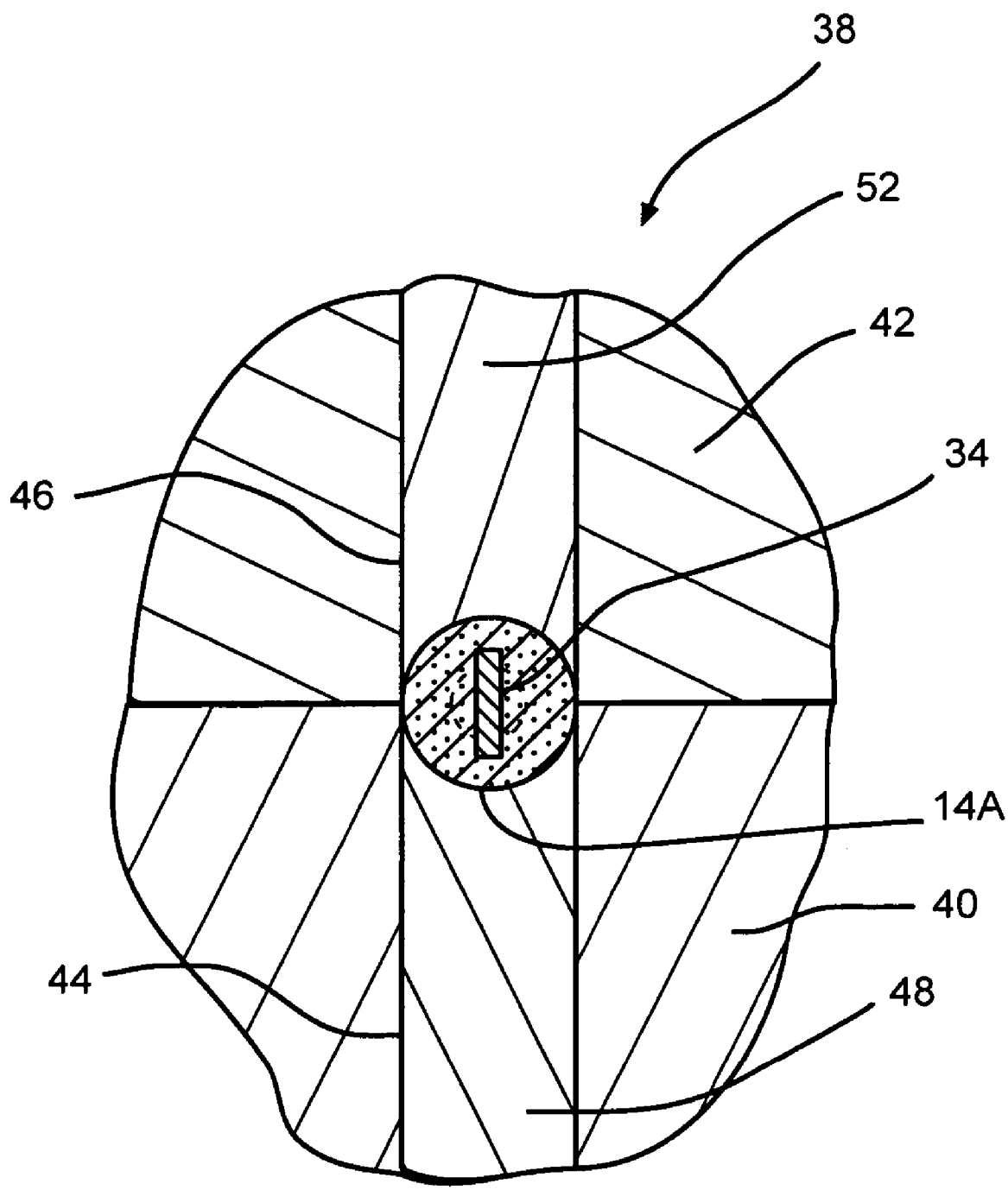
FIG. 17 is a partial cross-sectional view of the fixture 38 shown in FIG. 16 after the cathode has been radially pressed formed.

Referring now to FIGS. 16 to 21, several processes for building the cathode 14 comprising the cathode active material 14A contacted to the couple 34 will be described. The first embodiment is termed a radial pressing process and is illustrated in FIGS. 16 and 17 and comprises a fixture 38 having a base plate 40 and an upper plate 42. The plates 40, 42 are provided with respective slots 44 and 46. The upper plate 42 has its slot 46 aligned with the slot 44 in the base plate 40. A bar-shaped cradle 48 is fitted into the slot 44 of the base plate and comprises an upper edge provided with a semi-circular trough 50.

To build a cathode, a quantity of cathode active material 14A, such as $CF_x$ in a powdered form, is filled into the slot 44 supported on the cradle 48 until it is nearly level with the upper surface of the base plate 40. The couple 34 is next positioned with its proximal and distal ends 34A and 34B nested in the channel recesses (not shown) of the base plate. The upper plate 42 is positioned on top of the base plate 40. A further quantity of cathode active material 14A is loaded into the slot 46 in the upper plate 42 so that an equal amount is above and below the couple 34. An upper bar-shaped member 52 is received in the slot 46 and has an inverted semi-circular trough 54. A pressing force is then applied to the bar-shaped member 52 to move in a downwardly direction toward the lower bar-shaped cradle 48. This downward movement continues until the troughs 50 and 54 of the respective lower and upper bar-shaped members 48 and 52 touch each other. The cathode active material 14A has now been radially compressed into intimate contact with the couple 34 including the flats 34C to 34H to provide the cathode having a substantially circular cross-section along the longitudinal axis of couple 34. The formed cathode 14 including the couple 34 is removed from the fixture 38 for further processing in the cell 10.

One of the important aspects of the present invention is that the flats 34C to 34H serve as irregularly-shaped surfaces that prevent the cathode active material 14A from losing contact with the couple 34. By irregularly-shaped is meant that if the couple 34 is a cylindrical rod, the flats are of a different structure so that the cathode active material is incapable of sliding in an axial direction along the couple as well as separating and delaminating from the couple surface. The couple 34 can also have a square, triangular or other shape, in which case the flats 34C to 34H are still needed for these purposes.

Referring now to FIGS. 22 and 23, there is shown an alternate embodiment of a cylindrical rod shaped couple 150 provided with a plurality of scalloped portions 150A, 150B and 150C along its length. The scallops have generally curved indentation surfaces. FIGS. 24 and 25 show a cylindrical rod shaped couple 160 provided with a plurality of V-shaped indentations 160A, 160B and 160C along its length. FIGS. 26 and 27 show a cylindrical rod shaped couple 170 provided with a plurality of triangular shaped flats 180A, 180B and 180C along its length. FIGS. 28 and 29 show a cylindrical rod shaped couple 180 provided with a plurality of rectangular or square shaped flats 180A, 180B and 180C along its length. The function of the scalloped portions 150A to 150C, V-shaped portions 160A to 160, triangular shaped flats 170A to 170C and square shaped flats 180A to 180C is the same as that of the flats 34C to 34H. That is, these irregularly-shaped structures prevent the cathode active material from delaminating and separating from the respective couples 150, 160, 170 and 180 as well as from moving axially along the length thereof.

Figure 18:
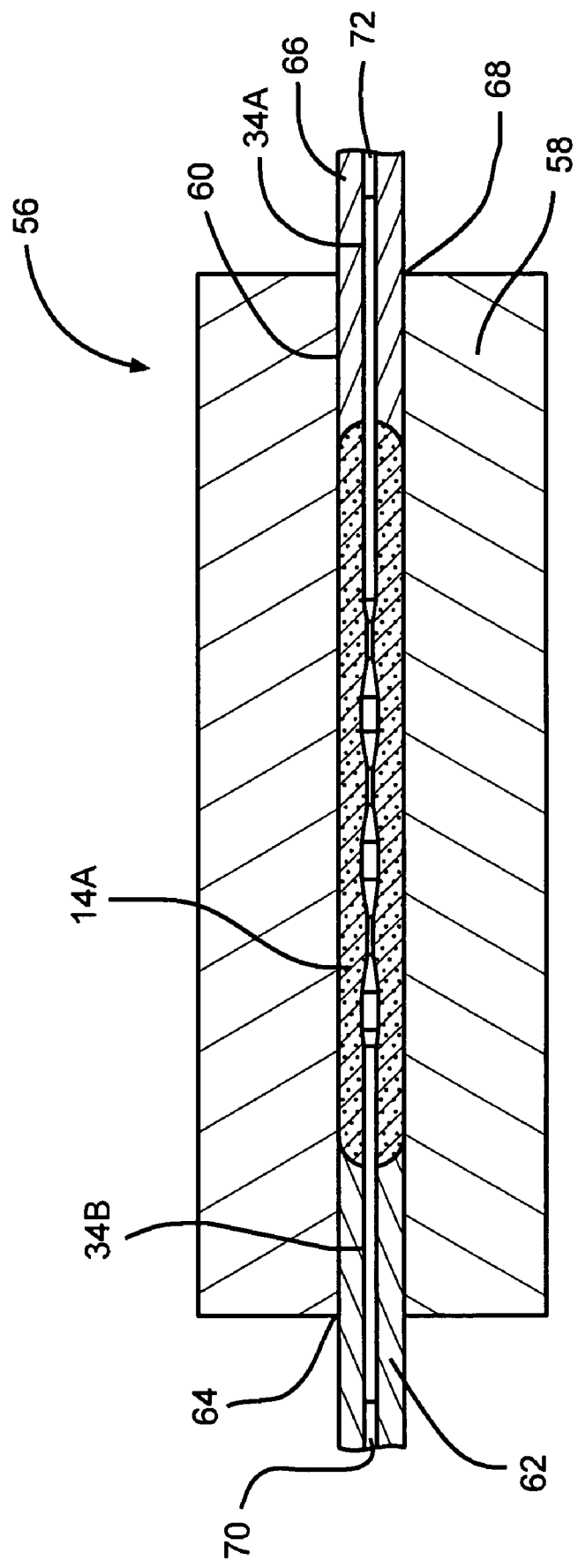
FIG. 18 is a partial cross-sectional view of a fixture 56 for forming the cathode 14 in an axial pressing process.
Figure 19:
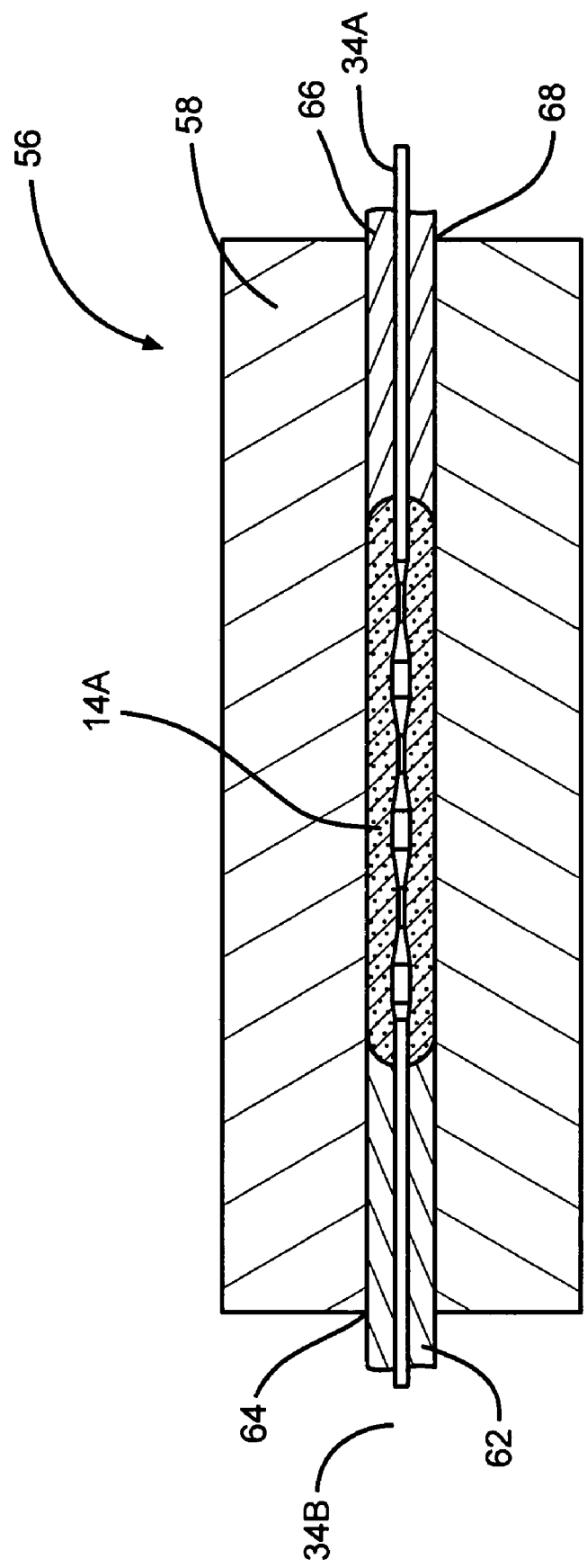
FIG. 19 is a partial cross-sectional view of the fixture 56 shown in FIG. 18 after the cathode has been axially pressed formed.

The second embodiment for building a cathode is termed an axial pressing process and is illustrated in FIGS. 18 and 19. The axial pressing process comprises a fixture 56 having a plate 58 provided with a through bore 60. The plate 58 supports a first ram 62 fitted into a left open end 64 of the bore 60 and a second ram 66 fitted into the right open end 68 thereof. Both rams are in a closely spaced, sliding relationship with the bore 60. The first ram 62 has a ram bore 70 sized to receive the proximal end 34A of the couple. A quantity of cathode active material 14A is then filled into the bore followed by the second ram 66. The second ram 66 has a ram bore 72 that receives the other, distal end 34B of the couple. A pressing force is then applied to the rams 62 and 66 causing them to move toward each other along the plate bore 60. This movement continues until the cathode active material 14A has been axially compressed into intimate contact with the couple 34 to provide the cathode having a substantially circular cross-section only the longitudinal axis of couple. If desired, a pressing force is applied to only one of the rams 62, 66, however, it is believed that a more uniform compression of cathode active material 14A occurs when the axial force is exerted from both directions along the couple length. The formed cathode 14 including the couple 34 is removed from the structure 56 for further processing into the cell 10.

Figure 20:
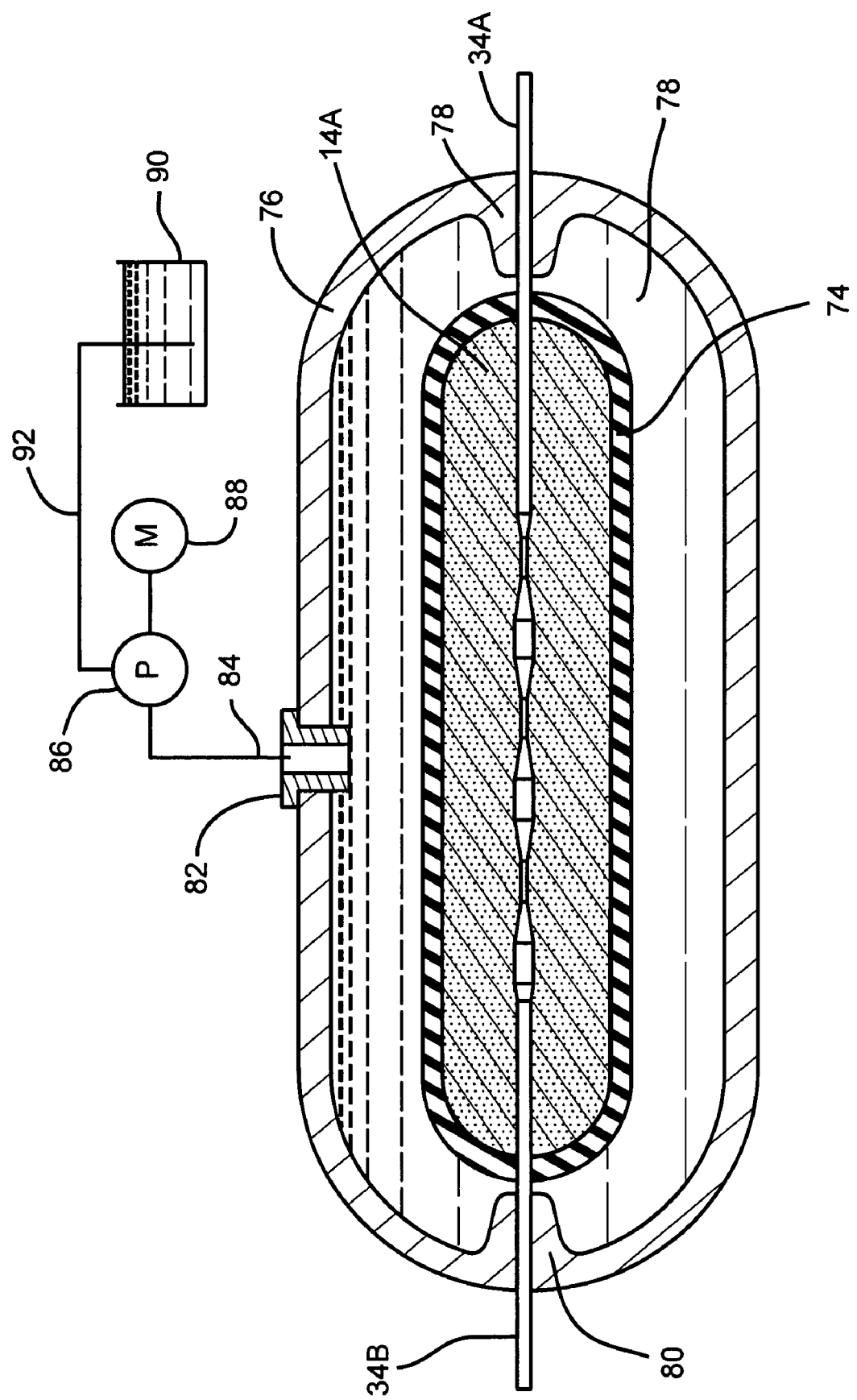
FIG. 20 is a cross-sectional view, partly in schematic, showing an apparatus for forming the cathode 14 in an isostatic pressing process.
Figure 21:
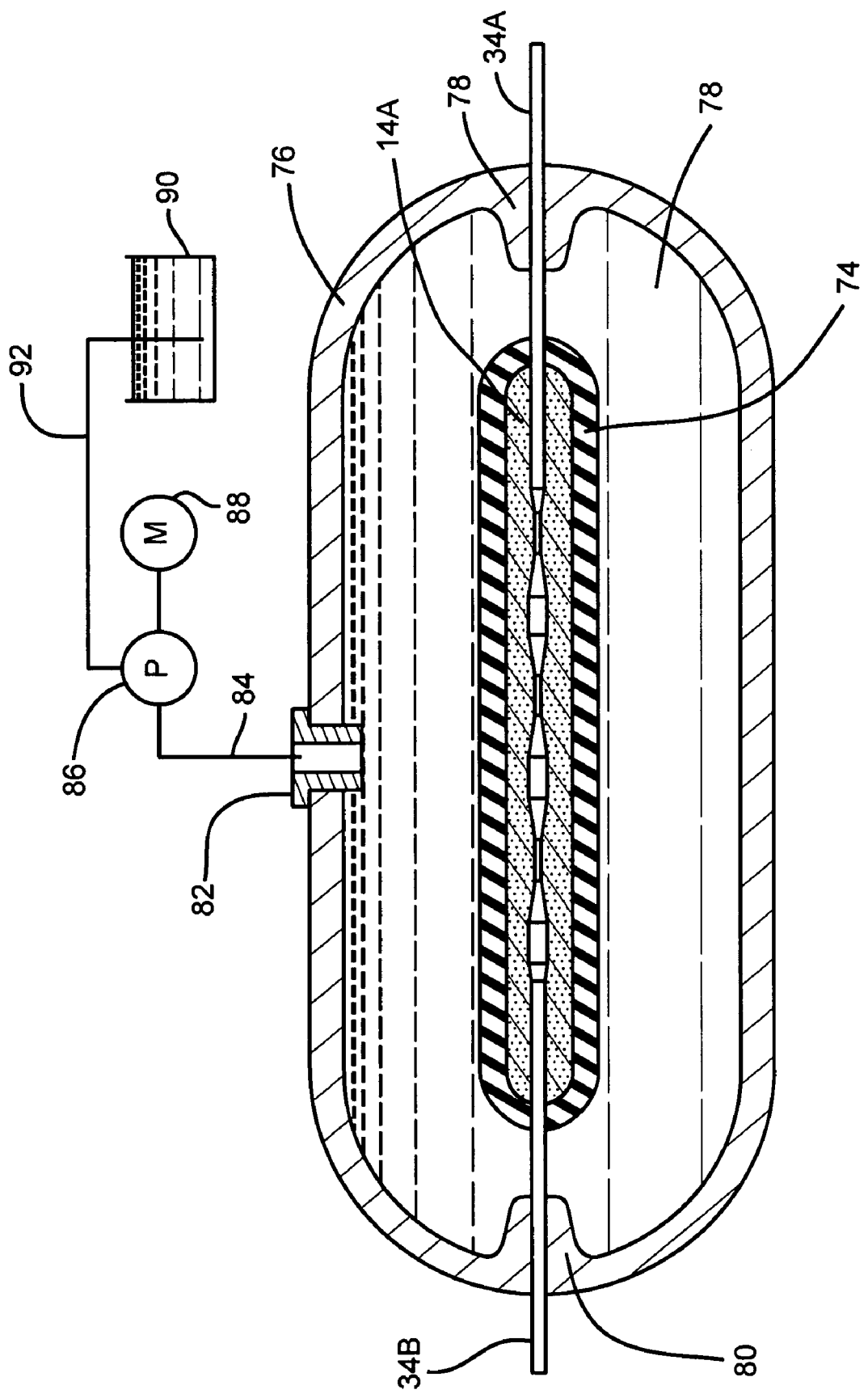
FIG. 21 is a cross-sectional view, partly in schematic, showing the apparatus in FIG. 20 after having formed the cathode by an isostatic pressing process.

The third embodiment is termed an isostatic pressing process and is illustrated in FIGS. 20 and 21. The isostatic pressing process comprises a flexible inner bladder 74 having a generally oval shape in cross-section surrounding a quantity of cathode active material 14A. The inner bladder 74 has openings 78 and 80 at each of its ends through which the proximal and distal ends 34A, 34B of the couple 34 extend. In this position, the couple 34 is centered in the bladder 74 with a uniform amount of active material provided about its circumference.

The inner bladder 74 including the couple 34 is supported in a rigid outer vessel 76 having a generally oval shape in cross-section. The outer vessel 76 contains a fluid 78 that surrounds the inner bladder 74. The outer vessel is provided with re-enforced portions 78 and 80 at its opposed ends that support the proximal and distal ends 34A, 34B of the couple in a sealed relationship. A port 82 is provided in the outer vessel sidewall and is connected to a conduit 84 in fluid flow communication with a pump 86 and a motor 88. The pump 86 is further in fluid flow communication with a reservoir 90 through a secondary conduit 92.

To build a cathode, a compressive force is exerted on the cathode active material 14A surrounding the couple and contained inside the inner bladder 74. This is done by activating the motor 88 to cause the pump 86 to move fluid from the reservoir 90 through the conduit 84 and into the outer vessel 76. The fluid pressure inside the vessel increases and causes the flexible inner bladder 74 to exert equal pressure against the cathode active material in an isostatic manner as the bladder collapses toward the couple 34. Once the proper cathode active material packing density is reached, the pump 86 is turned off and the pressure is removed from inside the outer vessel 76. Letting the fluid 78 flow back into the reservoir 90 does this. The formed cathode 14 including the couple 34 is then removed from the inner bladder 74 for further processing into the cell 10.

As previously described, the terminal pin 32 is supported in the upper lid 26 by the GTMS. The upper lid 26 (FIG. 5) is a disc-shaped member of the same material as the casing and comprises an upper surface 98 and a lower surface 100 extending to a cylindrical sidewall 102. The sidewall 102 is beveled where it meets the lower lid surface 100. This helps with moving the lid 26 into the casing tube 20 having the lid sidewall 102 in a snug fitting relationship with the upper open end thereof. In that position, the upper lid surface 98 is coplanar with the upper end of the casing tube 20.

An elastomer O-ring 104, preferably made of silicone elastomer that is poured and cured in place, occupies the lower meniscus of the sealing glass 28, generally coplanar with the lower surface 100 of the lid 26. A polymeric insulator disc 106 is supported on the terminal pin 32, seated against the lid lower surface 100. In this position, the outer surrounding edge of the disc 106 meets the lower edge of the lid bevel. The polymeric O-ring 104 is of a low viscosity elastomer and the insulator disc 106 is of a fluoro-polymer, such as ethylenetetrafluoroethylene (ETFE). Together, they help prevent electrolyte pooling in this meniscus area, which could be a potential space for lithium cluster bridging to the wall forming the lid opening 30. It also prevents attack of the sealing glass 28 by the cell electrolyte. The terminal pin 32 is then slip-fit into the bore 36 at the proximal end 34A of the current collector couple 34 and resistance welded thereto to connect the header assembly 22 to the cathode 14 (FIG. 6). In the alternate embodiment shown in FIG. 6A, the proximal end 34A of the couple 34 serves as the terminal pin.

It should be pointed out that the portion of the couple 34 and terminal pin 32 between the cathode 14 and the insulator disc 106 remains uncovered. With the preferred $Li/CF_x$ couple, this does not present a problem with lithium clusters bridging from the couple/terminal pin to the casing sidewall. The $Li/CF_x$ cell is not capable of being subjected to pulse discharge applications sufficient to develop a lithium ion gradient for lithium cluster growth. Lithium clusters are generally a phenomenon of high pulse power chemistries, such as Li/SVO and $Li/MnO_2$.

Next, the cathode 14 is enveloped in an ionically porous polymeric material serving as a separator 108 (FIG. 12). The separator envelope is made discontinuous at the proximal couple end 34A, but not at the distal end 34B. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C.H. Dexter, Div., Dexter Corp.).

Figure 7:
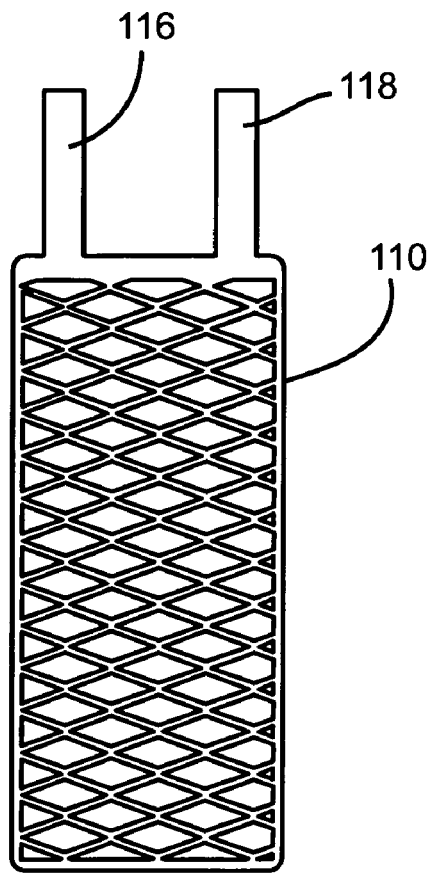
FIG. 7 is a side elevational view of the anode current collector 110.
Figure 8:
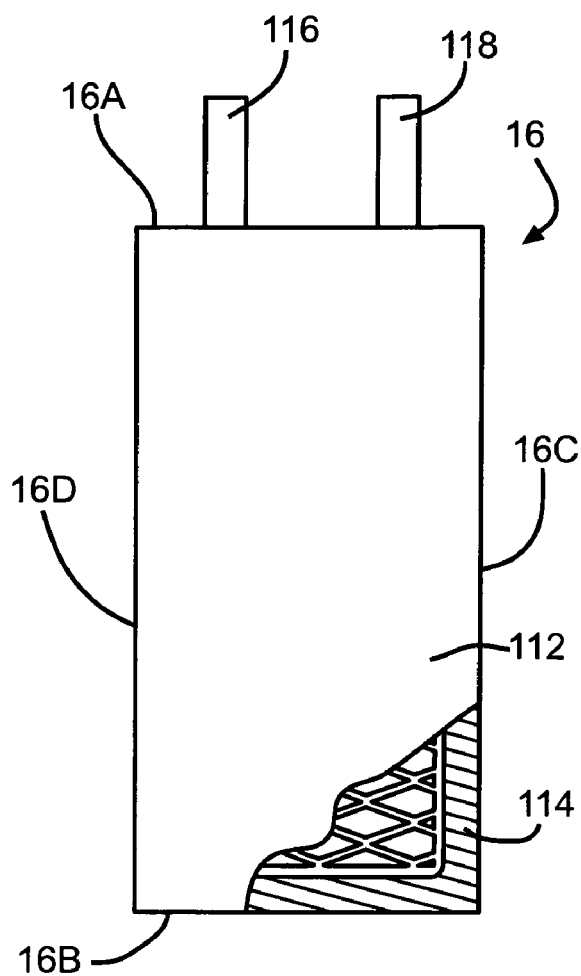
FIG. 8 is a side elevational view, partly broken away, of the anode assembly 16.

FIGS. 7 and 8 show the anode electrode 16 comprising an anode current collector 110 having an anode active material 112 such as an alkali metal, preferably lithium, contacted to both of its major sides. The anode current collector 110 is preferably of nickel, copper or stainless steel and is shown having a grid pattern of open perforations surrounded by a peripheral edge 114 devoid of perforations. Alternatively, the anode current collector may be completely solid. The thusly-constructed anode has a height between upper and lower ends 16A and 16B and a width between right and left edges 16C and 16D.

A pair of spaced apart leads 116 and 118, preferably integral with the current collector, extends from the upper edge. As will be explained in detail hereinafter, spacing between the leads 116, 118 provides them on opposite sides of the electrode assembly 12 when it is housed inside the casing 18. While two leads are shown, there may be one or more than two leads depending on the current requirements of the cell. The second anode lead provides redundant termination. The anode 16 is fitted with its own separator envelope 120, which is of one of the materials previously described as being suitable for the cathode separator 108. The leads 116, 118 reside outside the separator 120.

Figure 9:
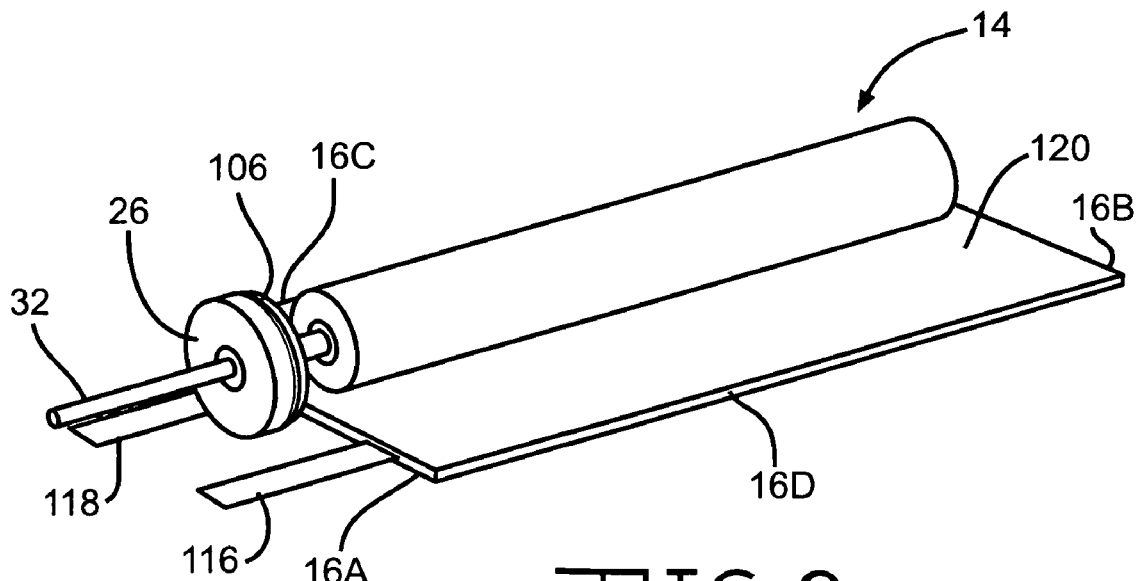
FIG. 9 is an isometric view showing the cathode and anode being provided as an electrode assembly.

As shown in FIGS. 9 and 10, laying the cathode 14 on the anode 16 at a generally centered location and rolling the anode around the cathode forms the electrode assembly 12.

The height of the anode 16 between the upper and lower ends 16A and 16B is somewhat longer than the height of the cathode along its longitudinal axis. The width of the anode between the right and left edges 16C and 16D is somewhat less than the circumference of the cathode 16. This leaves a gap between the anode edges 16C and 16D that helps as the electrode assembly is fitted into the cylindrical casing tube 20 as well as providing space inside the casing to relieve internal stress latter during cell discharge. The greater height of the anode in comparison to the cathode accommodates for some misalignment between the electrodes while maintaining anode material always opposite the cathode active material.

The header assembly 22 comprising the lid 26 snugly fits into the upper open end of the tube 20 with the diametrically opposed anode leads 116 and 118 extending from the tube 20. The leads are trimmed flush to the top of the upper lid. The lid 28 is then hermetically sealed to the tube 20 such as by laser welding. The leads 116, 118 captured between the lid 28 and tube 22 electrically connect the anode 16 to the casing 18 serving as the negative cell terminal. The terminal pin 32 contacting the cathode 14 by the intermediate couple 34 and insulated from the lid 28 and casing 18 by the sealing glass 28 serves as the cathode terminal. For a more detailed description of a cell having an electrode lead captured between a lid and casing, reference is made to U.S. Pat. No. 6,586,134 to Skoumpris. This patent is assigned to the assignee of the present invention and incorporated herein by reference.

Figure 13:
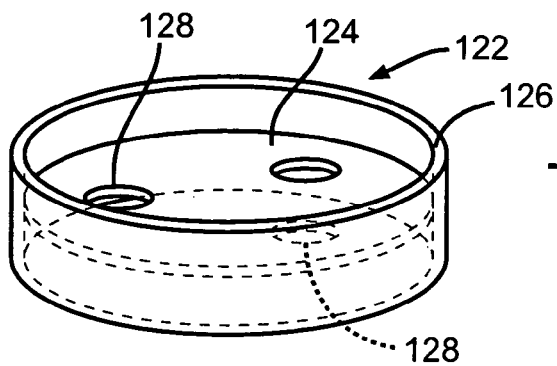
FIG. 13 is an isometric view of a lower insulator 122.
Figure 14:
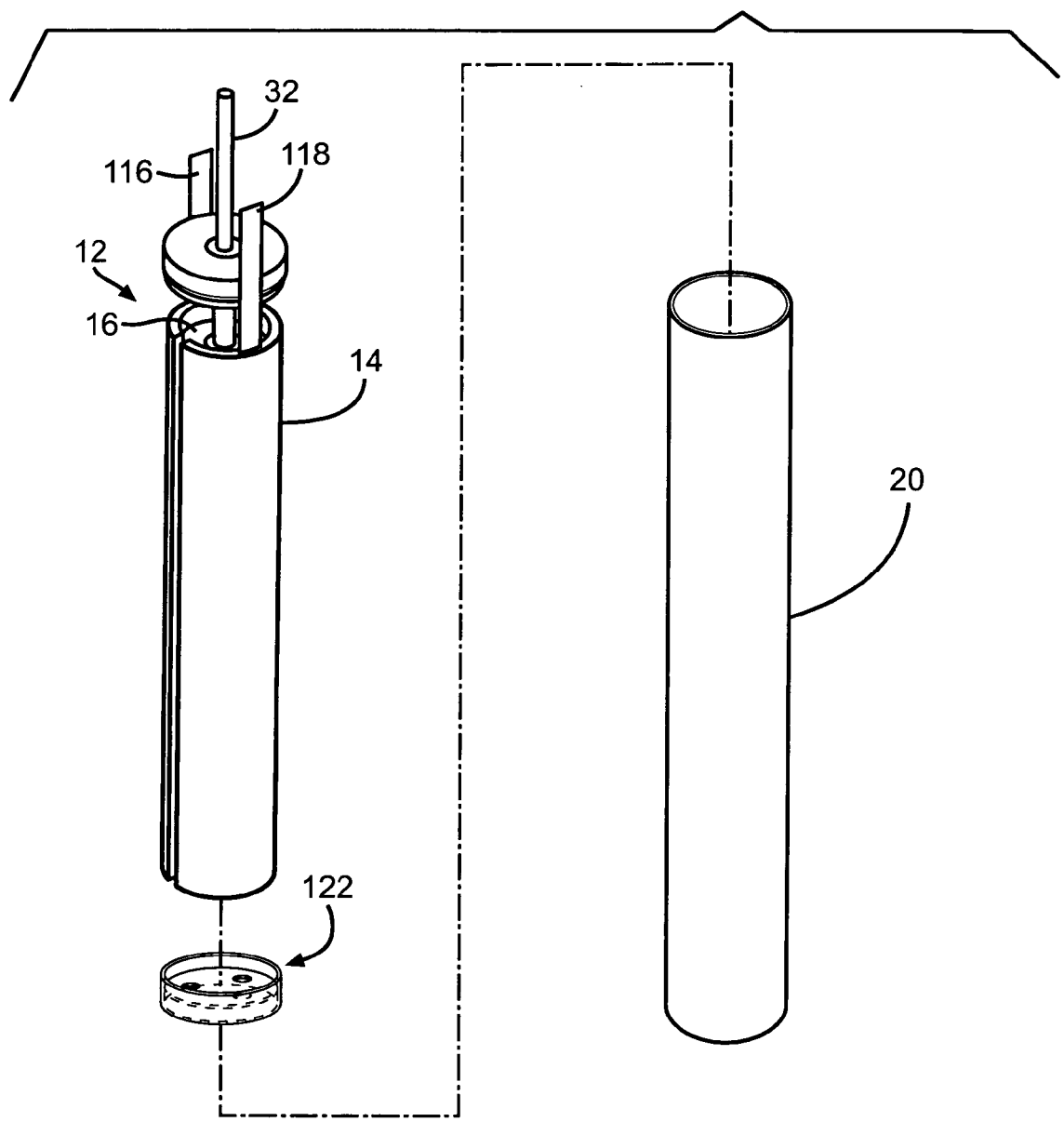
FIG. 14 is an exploded view of the electrode assembly 12 including header 22 being housed inside the casing 20.
Figure 15:
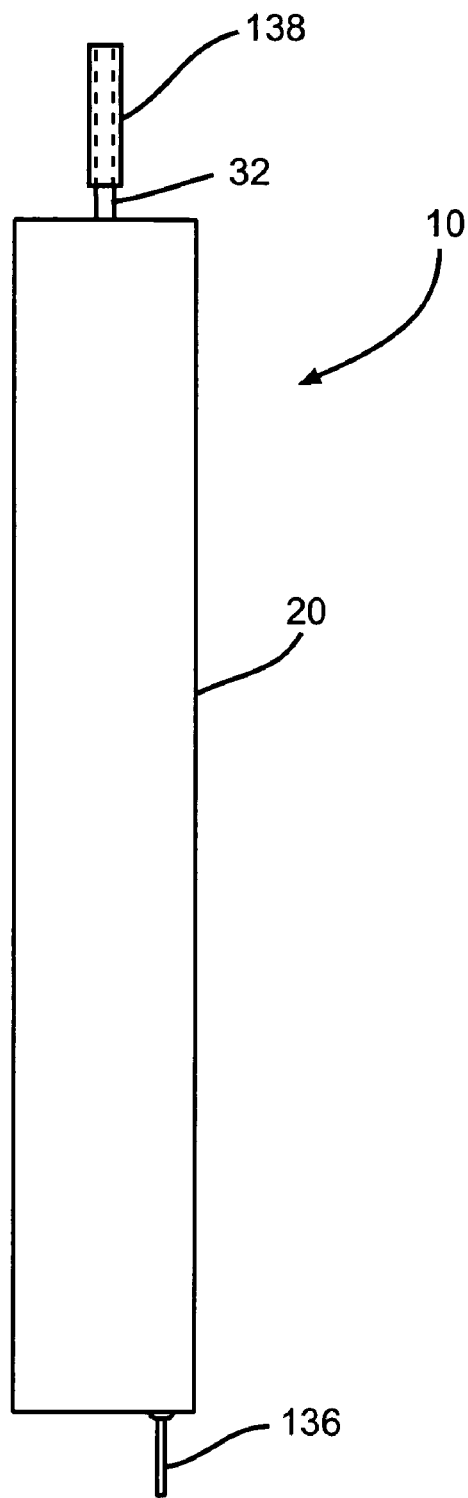
FIG. 15 is a side elevational view of the completed electrochemical cell 10.

As shown in FIGS. 1, 13 and 14, the lower end of the electrode assembly 12 is provided with a lower insulator 122. The lower insulator 122 is a unitary member of a polymeric material and comprises a disc 124 supporting a sleeve 126. The sleeve 126 comprises upper and lower edges with the disc 124 positioned about mid-way there between. A plurality of openings 128 is provided in the disc 124. The lower insulator 122 is fitted into the lower end of the casing tube 20 to help prevent heat generated by welding the lower cover 24 to the casing tube 20 from damaging the separators of the anode and the cathode.

The circular shaped lower lid 24, which is of the same material as the casing tube 20, is secured in the lower end of the tube 20 in a tight fitting relationship by a weldment 130 (FIG. 1). A central opening 132 in the lower lid 24 provides for filling an electrolyte (not shown) into the casing 18 for activating the cell 10. The openings 128 in the disc 124 help the electrolyte flow through the lower insulator 122 to wet the electrode assembly 12. A fill plug 134 is then fitted into the central opening 132 in the closure plate 24 and sealed therein such as by laser welding to hermetically seal the cell.

As previously discussed with respect to the lack of a problem with lithium clusters bridging from the couple/terminal pin to the casing sidewall, the same can be said for the open space between the distal end 34B of the couple 34 and the casing sidewall. With the preferred Li/$CF_x$ chemistry, there is not a problem with lithium clusters bridging here because the Li/$CF_x$ cell is not capable of being subjected to pulse discharge applications sufficient to develop a lithium ion gradient for lithium cluster growth.

Securing a negative polarity connection pin 136 to the lower lid 24 in electrical continuity with the casing tube 20 and upper lid 26 between which the anode current collector leads 116, 118 are captured completes the cell. A sleeve 138 is fitted onto the positive terminal pin 32 to help in making electrical connection there. This is particularly applicable when the terminal pin in made of molybdenum, which is difficult to weld to. Other pin materials may or may not need the sleeve.

By way of example, in an illustrative primary cell, the anode is of an alkali metal, preferably lithium, contacted to a nickel, copper or stainless steel current collector. The preferred cathode active material is $CF_x$. This electrochemical couple is preferably activated with an electrolyte can be a 1.0M to 1.4M solution of $LiAsF_6$ or $LiPF_6$ in γ-butyrolactone. A Li/silver vanadium oxide couple is typically activated with an electrolyte of 1.0M to 1.4M solution of $LiAsF_6$ or $LiPF_6$ in a 50:50 mixture of, by volume, 1,2-dimethoxyethene and propylene carbonate.

Those skilled in the art will readily recognize that the cell of the present invention can also be readily adapted to primary electrochemical systems of a liquid cathode type, or a secondary cell such as a lithium ion cell having a carbonaceous negative electrode and lithium cobalt oxide positive electrode.

In the secondary electrochemical cell, the anode or negative electrode comprises an anode material capable of intercalating and de-intercalating the anode active material, such as the preferred alkali metal lithium. A carbonaceous negative electrode comprising any of the various forms of carbon (e.g., coke, graphite, acetylene black, carbon black, glass carbon, "hairy carbon" etc.), which are capable of reversibly retaining the lithium species, is preferred for the anode material. A "hairy carbon" material is particularly preferred due to its relatively high lithium-retention capacity. "Hairy carbon" is a material described in U.S. Pat. No. 5,443,928 to Takeuchi et al., which is assigned to the assignee of the present invention and incorporated herein by reference. Graphite is another preferred material. Regardless of the form of the carbon, fibers of the carbonaceous material are particularly advantageous because they have excellent mechanical properties that permit them to be fabricated into rigid electrodes capable of withstanding degradation during repeated charge/discharge cycling. Moreover, the high surface area of carbon fibers allows for rapid charge/discharge rates.

Also in secondary systems, the positive electrode preferably comprises a lithiated material that is stable in air and readily handled. Examples of such air-stable lithiated cathode active materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

An electrolyte is also required to activate the anode/cathode combination in the secondary system. The composition of the electrolyte depends on the materials of construction of the anode and the cathode as well as the product application for the cell. A preferred electrolyte for a lithium ion secondary cell has a lithium salt dissolved in a solvent system of dimethyl carbonate, diethyl carbonate, ethyl methyl carbonate and propylene carbonate.

It is appreciated that various modifications to the inventive concepts described herein may be apparent to those of ordinary skill in the art without departing from the scope of the present invention as defined by the appended claims.

What is claimed is:

1. An electrochemical cell, which comprises:
   a) a casing comprising an open ended container closed by a lid;
   b) a first electrode comprising:
      i) a rod-shaped current collector having a length extending along a longitudinal axis from an upper rod end to a lower rod end, wherein the rod has a first cross-section perpendicular to its longitudinal axis at the upper end and at least two irregularly shaped areas characterized as deformations of the rod material to alter the cross-sectional shape from that of the first cross-section at the upper end, the at least two irregularly shaped areas being at two different perpendicular locations between the upper and lower rod ends, wherein the irregularly shaped areas are axially offset from each other in a range from 5° to 90°;
  ii) a first active material contacted to the rod-shaped current collector between the upper and lower ends thereof; and
  iii) wherein the upper rod end is connected to a terminal pin supported in the lid by a sealing glass and the terminal pin connected to the rod serves as a terminal for the first electrode with the distal end of the terminal pin extending outside the casing from the lid;
c) a second, counter electrode comprising a second active material contacted to a second current collector;
d) a separator segregating the first electrode from direct physical contact with the second electrode housed inside the casing, wherein the second electrode is positioned between the first electrode and at least part of the casing serving as its terminal; and
e) an electrolyte activating the first and second electrodes housed in the casing.

2. The electrochemical cell of claim 1 wherein the at least two irregularly shaped areas are selected from the group consisting of a flat, a scalloped shaped area, a V-shaped area, a triangular shaped area, a rectangular shaped area, and combinations thereof.

3. The electrochemical cell of claim 1 wherein the rod-shaped current collector has at least two flats as the irregularly shaped areas axially offset in a range from 5° to 90° with respect to each other.

4. The electrochemical cell of claim 1 wherein the open ended container closed by the lid comprising the casing is electrically connected to the second electrode as its terminal.

5. The electrochemical cell of claim 1 wherein the first electrode is characterized as having been formed by one of a radial pressing process, an axial pressing process, and an isostatic pressing process.

6. The electrochemical cell of claim 1 wherein the second electrode has a height between upper and lower ends and a width between right and left edges and wherein the right and left edges are spaced from each other with the second electrode in a surrounding relationship to the first electrode.

7. The electrochemical cell of claim 1 wherein the rod-shaped current collector is cylindrical where it is not provided with the at least two irregularly shaped areas.

8. The electrochemical cell of claim 1 wherein the first cross-sectional shape at the upper rod end is substantially similar to that of the lower rod end.

9. An electrochemical cell, which comprises:
a) a casing comprising an open ended container closed by a lid;
b) a cathode comprising:
  i) a rod-shaped cathode current collector having a first length extending along a longitudinal axis from an upper rod end to a lower rod end, wherein the rod has a first cross-section perpendicular to its longitudinal axis at the upper rod end that is substantially similar to a second perpendicular cross-section at the lower rod end and wherein the rod includes at least two irregularly shaped areas characterized as deformations of the rod material to alter the cross-sectional shape from that of the upper and lower rod ends, the two irregularly shaped areas being at two different perpendicular locations between the upper and lower rod ends, wherein the irregularly shaped areas are axially offset from each other in a range from 5° to 90° and wherein the upper end of the rod-shaped current collector is provided with a longitudinally aligned, co-axial counter bore;
  ii) a cathode active material contacted to the rod-shaped current collector; and
  iii) a terminal pin supported in the lid by a sealing glass and having a second length extending between proximal and distal ends, wherein the proximal end of the terminal pin is received in the counter bore provided in the upper rod end to electrically connect the terminal pin to the cathode as its terminal and wherein the distal end of the terminal pin extends outside the casing from the lid;
c) an anode comprising lithium or an anode material capable of intercalating and deintercalating lithium contacted to an anode current collector;
d) a separator segregating the cathode from direct physical contact with the anode housed inside the casing, wherein the anode is positioned between the cathode and at least part of the casing serving as the anode terminal; and
e) an electrolyte activating the anode and cathode housed in the casing.

10. The electrochemical cell of claim 9 wherein the irregularly shaped areas are selected from the group consisting of a flat, scalloped shaped area, a V-shaped area, a triangular shaped area, a rectangular shaped area, and combinations thereof.

11. The electrochemical cell of claim 9 wherein the rod-shaped cathode current collector has at least two flats as the irregularly shaped areas located between the upper and lower rod ends, the flats being axially offset in a range from 5° to 90° with respect to each other.

12. The electrochemical cell of claim 9 wherein the cathode is characterized as having been formed by one of a radial pressing process, an axial pressing process, and an isostaric pressing process.

13. The electrochemical cell of claim 9 wherein the anode has a height between upper and lower ends and a width between right and left edges and wherein the right and left anode edges are spaced from each other with the anode in a surrounding relationship to the cathode.

14. The electrochemical cell of claim 9 wherein the cathode active material is selected from the group consisting of fluorinated carbon, silver vanadium oxide, copper silver vanadium oxide, copper vanadium oxide, manganese dioxide, titanium disulfide, copper oxide, copper sulfide, iron sulfide, iron disulfide, lithium cobalt oxide, and mixtures thereof.

15. The electrochemical cell of claim 9 wherein the rod-shaped current collector is cylindrical where it is not provided with the at least two irregularly shaped areas.

16. The electrochemical cell of claim 9 wherein the cathode has a generally circular cross-section along the longitudinal axis of the rod-shaped cathode current collector.

17. A method for providing an electrochemical cell, comprising the steps of:
a) providing a casing comprising an open ended container closed by a lid;
b) providing a rod-shaped cathode current collector having a length extending along a longitudinal axis from an upper rod end to a lower rod end, wherein the rod has a first cross-section perpendicular to the longitudinal axis at the upper rod end;
c) deforming the current collector so that the rod has at least two irregularly shaped areas that are characterized as deformations of the rod material to alter its cross-sectional shape from that of the first cross-section at the upper end, the at two irregularly shaped areas being at two different perpendicular locations between the upper and lower rod ends, wherein the irregularly shaped areas are axially offset from each other in a range from 5° to 90°;

d) contacting a cathode active material to the rod-shaped cathode current collector to form a cathode;

e) providing a terminal pin supported in the lid by a sealing glass and having a second length extending between proximal and distal ends;

f) contacting lithium or an anode material capable of intercalating and deintercalating lithium to an anode current collector to form an anode;

g) segregatina the cathode from direct physical contact with the anode by an intermediate separator;

h) housing the anode and cathode in electrical association with each other in the open ended container, wherein the anode is positioned between the cathode and the container serving as the anode terminal;

i) connecting the proximal end of the terminal pin with the upper rod end to electrically connect the terminal pin to the cathode as its terminal;

j) closing the open ended container with the lid to provide the casing, wherein the distal end of the terminal pin extends outside the casing from the lid; and k) activating the anode and cathode housed in the casing with an electrolyte.

18. The method of claim 17 including selecting the at least two irregularly shaped areas from the group consisting of a flat, a scalloped shaped area, a V-shaped area, a triangular shaped area, a rectangular shaped area, and combinations thereof.

19. The method of claim 17 including providing the rod-shaped cathode current collector having at least two flats as the at least two irregularly shaped areas, the flats being axially offset in a range from 5° to 90° with respect to each other.

20. The method of claim 17 including forming the cathode by one of a radial pressing process, an axial pressing process, and an isostatic pressing process.

21. The method of claim 17 including providing the anode having a height between upper and lower ends and a width between right and left edges and wherein the right and left edges are spaced from each other with the anode in a surrounding relationship to the cathode.

22. The method of claim 17 including providing the rod-shaped current collector being cylindrical where it is not provided with the at least two irregularly shaped areas.

23. The method of claim 17 including providing the first cross-sectional shape at the upper rod end being substantially similar to that of the lower rod end.

24. An electrochemical cell, which comprises:
a) a casing comprising an open ended container closed by a lid;
b) a first electrode comprising:
  i) a rod-shaped current collector having a length extending along a longitudinal axis from an upper rod end to a lower rod end, wherein the rod has a first cross-sectional shape perpendicular to its longitudinal axis at the upper rod end that is substantially similar to a second perpendicular cross-section at the lower rod end and wherein the current collector includes at least two irregularly shaped areas characterized as deformations of the rod material to alter the cross-section shape from that of the upper and lower rod ends, the two irregularly shaped areas being at two different perpendicular locations between the upper and lower rod ends, wherein the irregularly shaped areas are axially offset from each other in a range from 5° to 90°;
  ii) a first active material contacted to the rod-shaped current collector between the upper and lower ends thereof; and
  iii) wherein the rod-shaped current collector is supported in the lid by a sealing glass and serves as a terminal for the first electrode with the first rod end extending outside the casing from the lid;
c) a second, counter electrode comprising a second active material contacted to a second current collector;
d) a separator segregating the first electrode from direct physical contact with the second electrode housed inside the casing, wherein the second electrode is positioned between the first electrode and at least part of the casing serving as its terminal; and
e) an electrolyte activating the first and second electrodes housed in the casing.

25. A method for providing an electrochemical cell, comprising the steps of:
a) providing a casing comprising an open, ended container closed by a lid;
b) providing a rod-shaped cathode current collector having a length extending along longitudinal axis from an upper rod end to an lower rod end, wherein a first cross-section perpendicular to the longitudinal axis at the upper rod end is substantially similar to a second perpendicular cross-section at the lower rod end and wherein the current collector includes at least two irregularly shaped areas characterized as deformations of the rod material that alter its cross-sectional shape from that of the upper and lower rod ends, the two irregularly shaped areas being at two different perpendicular locations between the upper and lower rod ends, wherein the irregularly shaped areas are axially offset from each other in a range from 5° to 90°;
c) contacting a cathode active material to the rod-shaped cathode current collector to form a cathode;
d) supporting the rod-shaped cathode current collector in the lid by a sealing glass so that the rod serves as a terminal for the cathode;
e) contacting lithium or an anode material capable of intercalating and deintercalating lithium to an anode current collector to form an anode;
f) segregating the cathode from direct physical contact with the anode by an intermediate separator;
g) housing the anode and cathode in electrical association with each other in the open ended container, wherein the anode is positioned between the cathode and the container serving as the anode terminal;
h) closing the open ended container with the lid to provide the casing, wherein the upper rod end extends outside the casing from the lid; and
i) activating the anode and cathode housed in the casing with an electrolyte.

* * * * *

UNITED STATES PATENT AND TRADEMARK OFFICE
CERTIFICATE OF CORRECTION

PATENT NO. : 7,611,805 B2 Page 1 of 1
APPLICATION NO. : 11/214635
DATED : November 3, 2009
INVENTOR(S) : Dominick Frustaci et al.

It is certified that error appears in the above-identified patent and that said Letters Patent is hereby corrected as shown below:

Col. 11, line 15, Claim 17 g), delete "segregatina" and insert --segregating--

Signed and Sealed this

Twenty-fifth Day of May, 2010

David J. Kappos
*Director of the United States Patent and Trademark Office*